F. L. RAPSON.
LIFTING JACK.
APPLICATION FILED JULY 11, 1918.
1,387,905.
Patented Aug. 16, 1921.
2 SHEETS—SHEET 1.
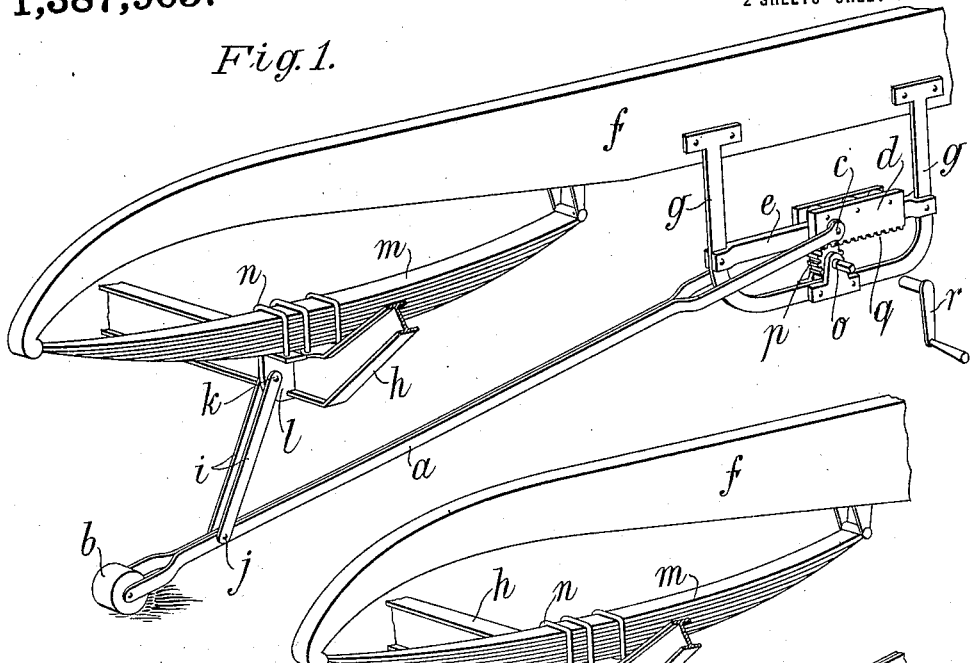
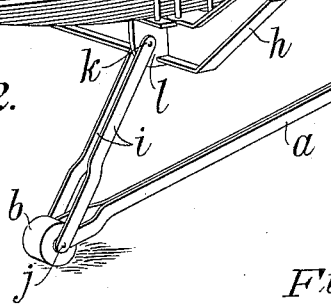
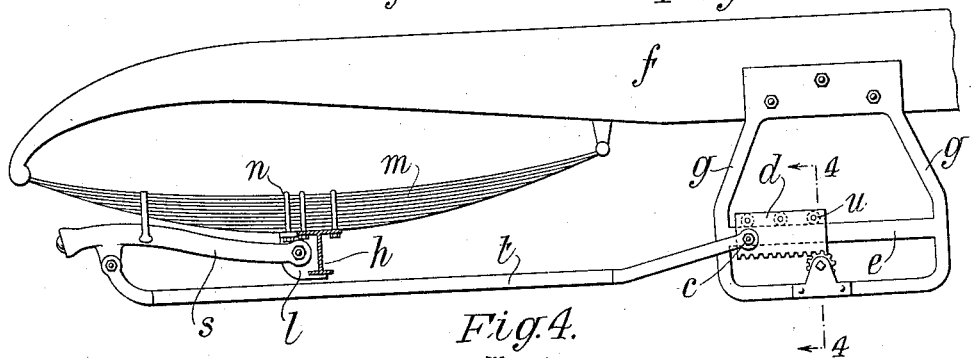
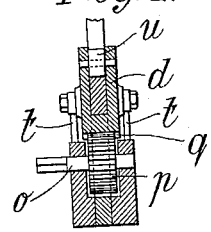
INVENTOR
F. L. RAPSON

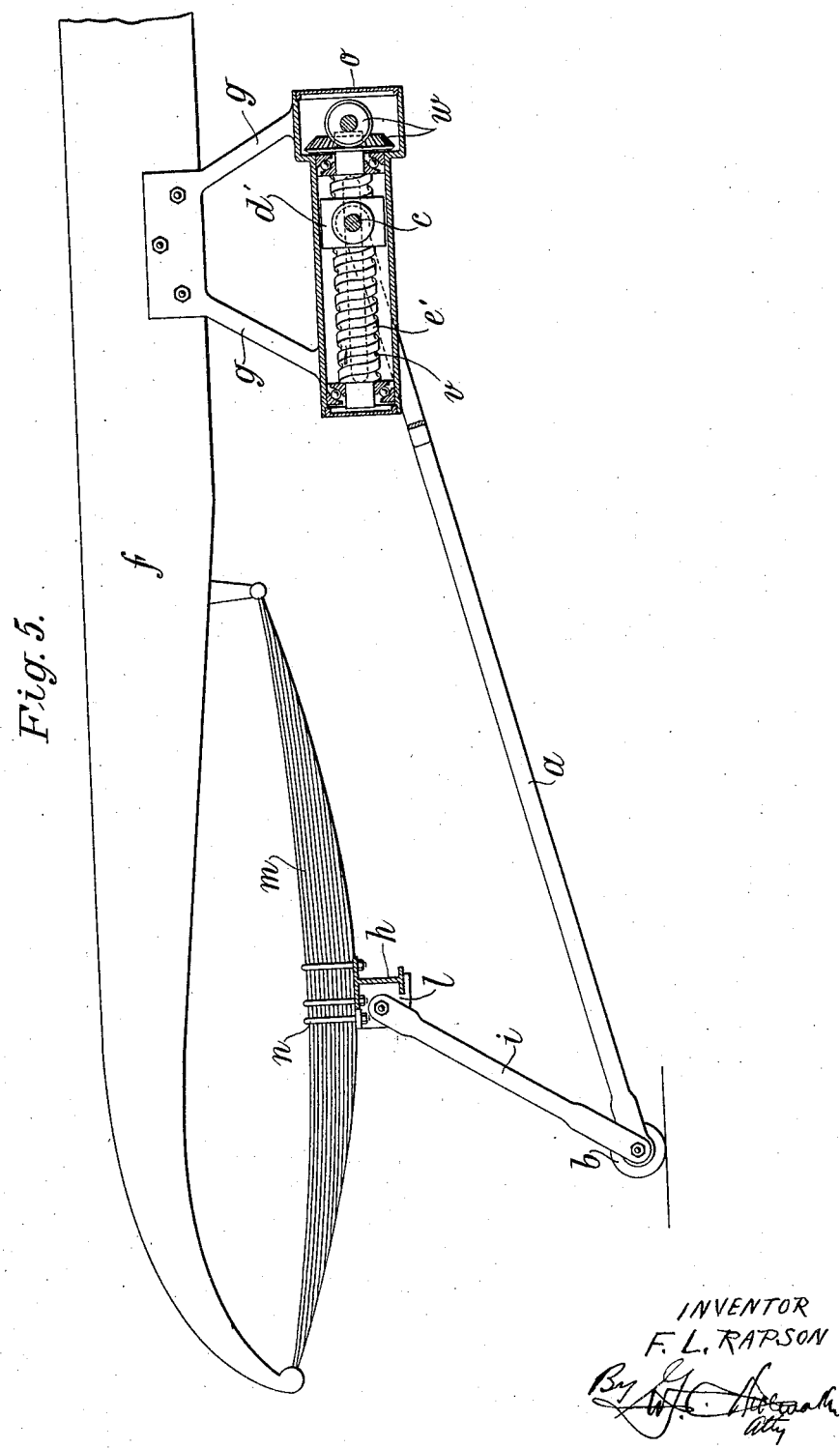

UNITED STATES PATENT OFFICE.

FREDERICK LIONEL RAPSON, OF LIVERPOOL, ENGLAND.

LIFTING-JACK.

1,387,905.  Specification of Letters Patent.  Patented Aug. 16, 1921.

Application filed July 11, 1918. Serial No. 244,448.

*To all whom it may concern:*

Be it known that I, FREDERICK LIONEL RAPSON, a subject of His Majesty the King of England, and resident of Liverpool, in the county of Lancaster, Kingdom of England, have invented certain new and useful Improvements in or Relating to Lifting-Jacks, of which the following is a specification.

This invention relates to improvements in or modifications of lifting jacks and the like for use on motor road and other vehicles of the type described in my co-pending United States application Serial No. 208,497 dated the 22nd day of December, 1917.

In my said prior application I described a lifting jack having a lever, or the like pivoted to a convenient part of the chassis such as the axle and adapted to be actuated by hand, through the medium of a member connected to a sleeve slidably mounted on a shaft or rod so that the weight of the car can be taken off each wheel separately or all of the wheels to relieve the tires when in the garage, or to jack up the car when it is desired to repair punctures or effect other repairs or to raise the car for washing or inspection purposes.

According to this invention I provide adjacent to one or more of the wheels of the vehicle and to a convenient part of the chassis a lever or the like which is pivotally connected to a sleeve slidably mounted on a bar or rod and connected at or adjacent to its outer end to the vehicle or the axle thereof by a link or links; means being provided to actuate the sleeve by hand so that the lower end of the lever will engage the ground and raise the adjacent wheel of the vehicle or draw up the said lever and place it out of action.

The invention also consists in actuating a lever, pivoted to the axle or other convenient part of the vehicle, by a tie or coupling or other members connected to a sleeve or sleeves adapted to be moved along a rod or bar, through the medium of a rack and pinion device by the rotation of a hand-wheel or handle.

The invention will now be described with reference to the accompanying drawings in which:—

Figure 1 is a perspective view of one form of jack and operating means constructed according to this invention, Fig. 2 is a perspective view of a modified form of jack leg;

Fig. 3 is a front elevation of a further modified construction;

Fig. 4 is a cross section to an enlarged scale taken on the line 4—4 of Fig. 3 and Fig. 5 is a sectional elevation showing a modified form of operating means for the jack shown in Fig. 1.

In one form of this invention as shown in Fig. 1 a lever or the like $a$ having a roller $b$ mounted at its lower end, is pivoted adjacent to each wheel of a motor car or other vehicle. Each lever $a$ is pivotally connected at $c$ to a sleeve or the like $d$ which is adapted to slide on a rod or bar $e$ secured at each end in any suitable manner to the chassis $f$ or other part of the vehicle. This bar or rod $e$ is preferably mounted on the lower ends of brackets or a bracket $g$ secured to and depending from the chassis frame $f$. Each bracket or pair of brackets $g$ carrying the bar or rod $e$ is disposed adjacent to each wheel and to the rear or inner side of each axle $h$. A link or links $i$ is or are pivotally connected at one end to a convenient part of each lever $a$ and the other end or ends $k$ of the link or links $i$ is or are connected to a bracket $l$ disposed in front of the axle $h$. The brackets $l$ for the links $i$ are carried from the spring $m$ by U-shaped bolts $n$ disposed over the spring $m$, as will be readily understood. Adjacent to each sleeve $d$ slidably mounted on the rod or bar $e$ is transversely disposed a shaft $o$. On the inner end of this shaft $o$ is mounted a pinion wheel or the like $p$ which is adapted to engage a rack $q$ formed on or connected to the sleeve $d$ preferably at the lower side thereof. This transverse shaft $o$ is rotatably mounted in an extension of the bearings $g$ hung from the chassis frame or from a bearing on the footboard and is permitted at its outer end to detachably receive a crank or the like $r$.

In operation, such as in the event of a puncture to one of the tires the driver places the operating handle $r$ on the squared end of the transverse shaft $o$ adjacent to the wheel having the punctured tire and turns the same. This movement rotates the transverse operating shaft $o$ and likewise the pinion $p$ thereon. The sleeve $d$ is thus moved along the bar or rod $e$ by the teeth on the pinion $p$ engaging with the teeth on the rack $q$. The sleeve $d$ will be moved inwardly along the bar or rod $e$ and pull the upper end of the lever $a$ and turn the link $i$ on its pivot $k$ to a more vertical position so that the roller $b$ on the outer or lower end of the lever $a$ will contact with the ground and raise the desired wheel therefrom so that the puncture can be attended to. When the tire is repaired the handle $r$ is rotated in the opposite direction to move the sleeve outwardly and raise the jack lever $a$ back to its normal position, where it will be screened from view under the spring $m$ of the vehicle.

In a modified construction as shown in Fig. 2 the link or links $i$ is or are connected to the outer end of the lever $a$ and the ground engaging roller $b$ is mounted on the ends of the lever $a$ and links $i$.

In a further modified construction as shown in Figs. 3 and 4 a lever or the like $s$ is pivoted at its upper end to the bracket $l$ which is secured in any suitable manner to the front and rear axle adjacent to the spring $m$ thereon. Each lever $s$ is pivotally connected by a suitably shaped tie bar or coupling rod $t$ to the sleeve $d$ which is adapted to be actuated as previously described. The sleeve $d$ is preferably provided at its upper side with anti-friction rollers $u$. It will be understood that the slidable sleeve to which the bar $a$, shown in Fig. 1 is pivoted may be operated by any other suitable means such as by, for instance, an antifriction screw threaded in this instance as shown in Fig. 5. The rod $e'$ and sleeve $d'$ are formed with coöperating helical grooves $v$ for the reception of balls or the like and the rod is rotated by means of a handle (not shown) through the medium of bevel gear wheels $w$.

Having now particularly described and ascertained the nature of my said invention and in what manner the same is to be performed, I declare that what I claim is:—

1. In a lifting jack for vehicles, a chassis, a leg pivoted at its inner end adjacent the axle of the chassis, a bracket secured to the chassis, a bar connected to the bracket, a sleeve slidable on said bar and provided with a rack, a connection between said leg and the sleeve, a pinion journaled on the bracket and having mesh with the rack of the sleeve so that on operation of the pinion the sleeve is moved along said bar to raise and lower said leg.

2. In a lifting device for vehicles, a chassis frame, an axle and a spring having connection with the chassis frame, a lifting leg pivoted adjacent the axle a bracket secured to the chassis frame, a bar having connection with the bracket, a sleeve slidable on the bar, means whereby the sleeve may be moved along said bar, and a connection between the lifting leg and the sleeve so that upon movement of the sleeve along the bar the lifting leg is raised and lowered.

In testimony whereof I have hereunto signed my name.

FRED LIONEL RAPSON.